(12) United States Patent
Roulo

(10) Patent No.: US 6,450,453 B1
(45) Date of Patent: Sep. 17, 2002

(54) ACTIVE STEERING OF AN APPENDAGE ON A SPACECRAFT USING PIEZOELECTRIC ACTUATORS

(75) Inventor: Eric J. Roulo, Mountain View, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/684,225

(22) Filed: Oct. 6, 2000

(51) Int. Cl.$^7$ ................................................ B64G 1/00
(52) U.S. Cl. ............................ 244/158 R; 244/129.1; 248/638
(58) Field of Search ........................... 244/158 R, 173, 244/117 R, 129.1; 248/638

(56) References Cited

U.S. PATENT DOCUMENTS 5,348,124 A * 9/1994 Harper ..................... 188/378
6,022,005 A * 2/2000 Gran et al. ................ 244/164
6,275,751 B1 * 8/2001 Stallard et al. ............. 701/13

* cited by examiner

Primary Examiner—J. Woodrow Eldred
(74) Attorney, Agent, or Firm—Kenneth W. Float

(57) ABSTRACT

Apparatus and methods for pointing a non-deployable or deployable appendage disposed on a spacecraft. The appendage is secured to a backup structure comprising a plurality of beams. A plurality of control beams are secured to the backup structure. A plurality of deformation control elements, such as piezoelectric elements, for example, are secured to selected surfaces of the plurality of control beams. The deformation control elements are connected to a control source, such as a voltage control source, for example. Selected deformation control elements are activated to deform the associated control beams to point the deployable appendage in a desired direction.

20 Claims, 3 Drawing Sheets

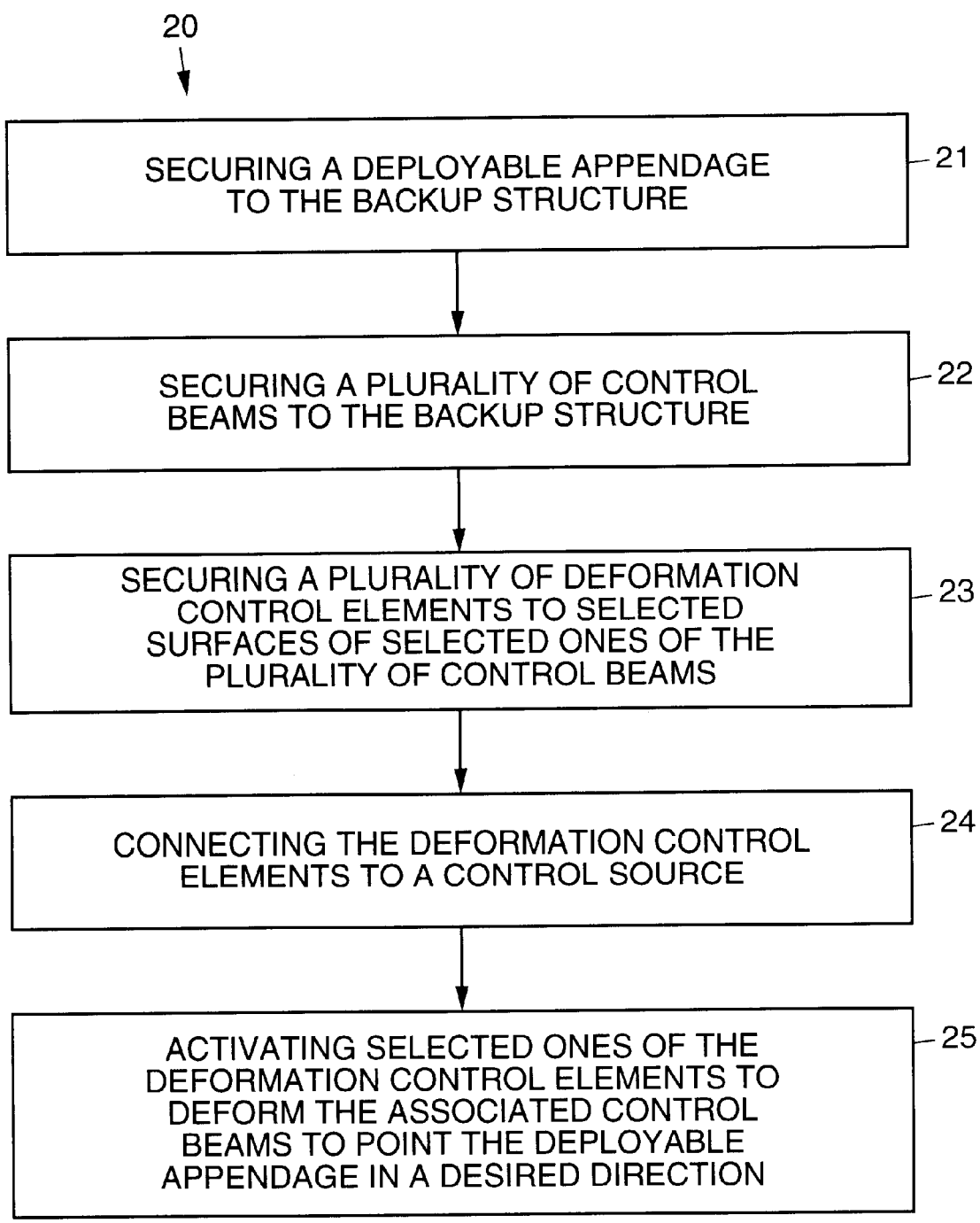

ACTIVE STEERING OF AN APPENDAGE ON A SPACECRAFT USING PIEZOELECTRIC ACTUATORS

BACKGROUND

The present invention relates generally to spacecraft, and more particularly, to apparatus and methods that use smart materials to deform backup structures for the purpose of pointing or controlling non-deployable or deployable appendages on a spacecraft.

The assignee of the present invention manufactures and deploys communication satellites. Such communication satellites carry deployable appendages such as reflector antennas that are directed towards the Earth, and solar wings, and the like. In certain instances, the reflector antennas must be steered to point them in a different direction or to compensate for thermal distortions or spacecraft motions.

Current mechanisms that are used to point such deployable appendages, and in particular the reflector antennas, include deployment and positioning mechanisms (DAPMs), antenna positioning mechanisms (APMs), bias adjustment mechanisms (BAMs) and two-axis antenna pointing mechanisms (TAAPMs). Both the bias adjustment mechanism and antenna positioning mechanism consist of two linear actuators which rotate the reflector about a pivot. The deployment and positioning mechanism and two-axis antenna pointing mechanism are both rotary mechanisms which allow them to have more range but larger step sizes than the bias adjustment mechanisms and antenna positioning mechanisms.

It would be desirable to have apparatus and methods for pointing a non-deployable or deployable appendage, such as a reflector antenna, disposed on a satellite that improves the pointing accuracy compared to conventional antenna pointing techniques. It is therefore an objective of the present invention to provide for improved apparatus and methods that use smart materials to deform a backup structure used to secure a non-deployable or deployable appendage for the purpose of pointing the non-deployable or deployable appendage attached thereto.

SUMMARY OF THE INVENTION

To accomplish the above and other objectives, the present invention uses smart materials, such as piezoelectric elements, to deform a backup structure holding a non-deployable or deployable appendage disposed on a spacecraft. The controllable deformation provided by the smart materials is used to point or position reflector antennas, or other non-deployable deployable appendages disposed on the spacecraft.

More particularly, apparatus and methods are provided for pointing a non-deployable deployable appendage disposed on a spacecraft. The appendage is secured to a backup structure comprising a plurality of beams. A plurality of control beams are secured to the backup structure. A plurality of deformation control elements, such as piezoelectric elements, for example, are secured to selected surfaces of the plurality of control beams. The deformation control elements are connected to a control source, such as a voltage control source, for example. Selected deformation control elements are activated to deform the associated control beams to point the deployable appendage in a desired direction.

For example, a reflector backup structure is used to secure a reflector antenna to the spacecraft. One or more piezoelectric elements or patches are disposed at predetermined locations on the reflector backup structure. The reflector backup structure may have its deformation controlled by controlling the voltage applied to the piezoelectric elements in order to deform the reflector backup structure and point the reflector antenna attached thereto.

The present invention uses the reflector backup structure with its piezoelectric elements as a controllable, deformable positioning mechanism. The present invention provides for high bandwidth, high resolution positioning of a reflector antenna, or the like, with few (or no) moving parts. The reflector backup structures or other non-deployable deployable appendage may be tailored to minimize size and mass.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 is a flow diagram that illustrates and exemplary method in accordance with the principles of the present invention.

DETAILED DESCRIPTION

Figure 1:
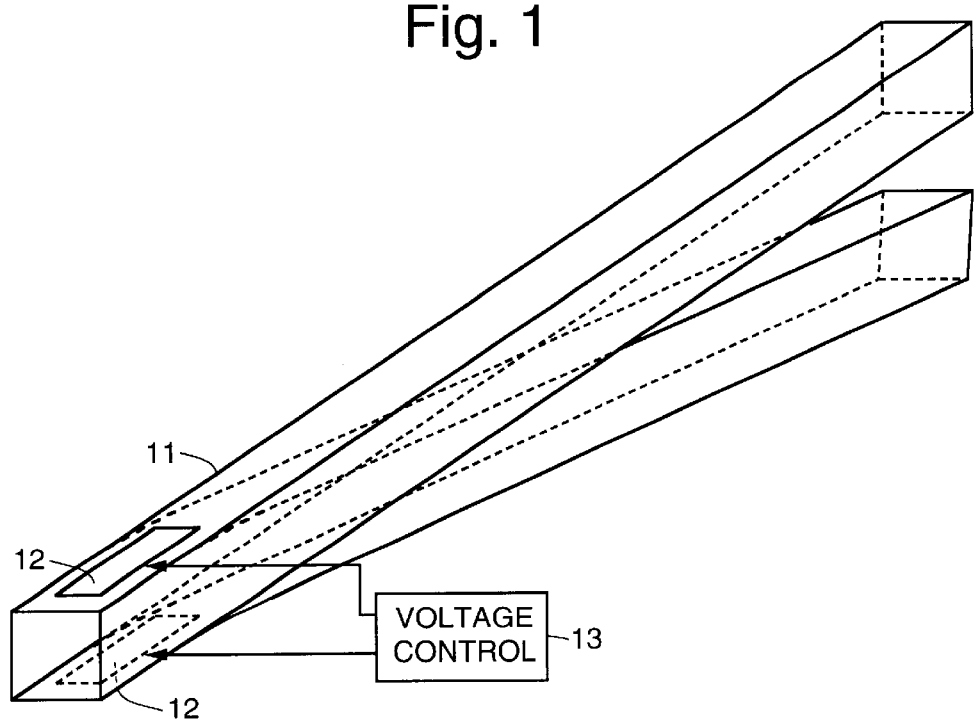
FIG. 1 illustrates deformation of an exemplary beam using a pair of piezoelectric elements in accordance with the principles of the present invention.

Referring to the drawing figures, FIG. 1 illustrates deformation of an exemplary structural member 11 or beam 11 using a pair of piezoelectric elements 12 in accordance with the principles of the principles of the present invention. The piezoelectric elements 12 are disposed on opposite surfaces of the structural member 11 or beam 11 and are connected to a voltage control source 13. Appropriate voltage selection and application to the pair of piezoelectric elements 12 deforms the structural member 11 or beam 11 in a predetermined manner by a predetermined amount.

More particularly, the piezoelectric element 12 are bonded to the surface of the structural member 11 in a region where an induced strain will cause large structural deformation. Piezoelectric elements 12 available from ACX may be readily adapted for this purpose. For example, model QP40N and QP40W piezoelectric actuators may be used as the piezoelectric elements 12.

Figure 2:
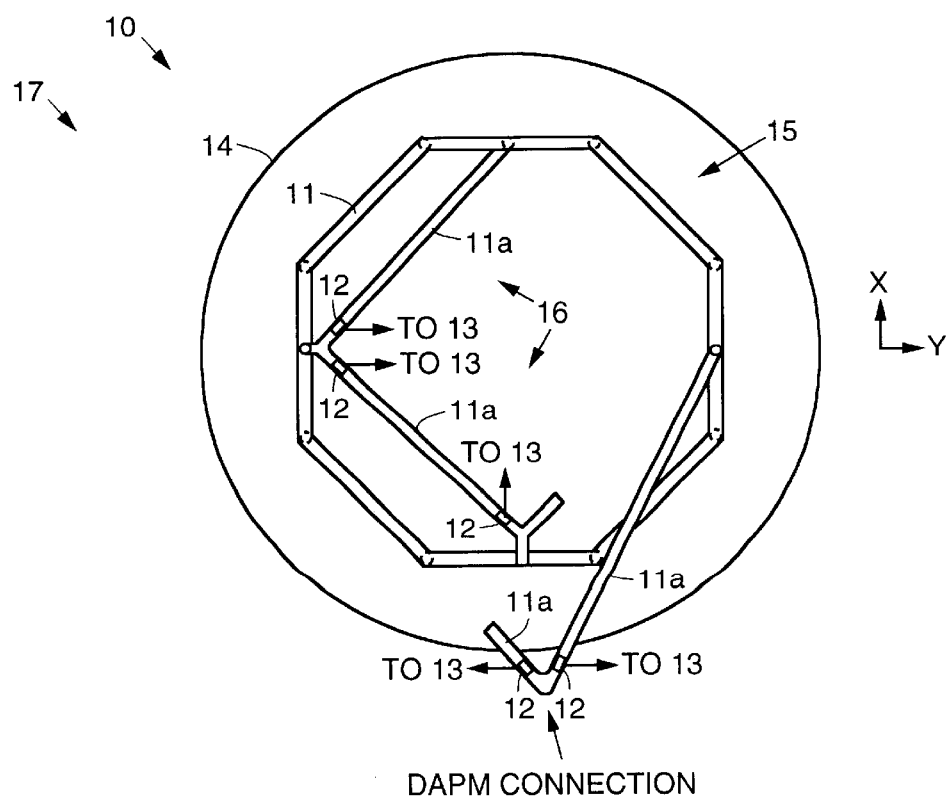
FIG. 2 illustrates an exemplary reflector antenna coupled to a backup structure comprising piezoelectric elements in accordance with the principles of the present invention.
Figure 3:
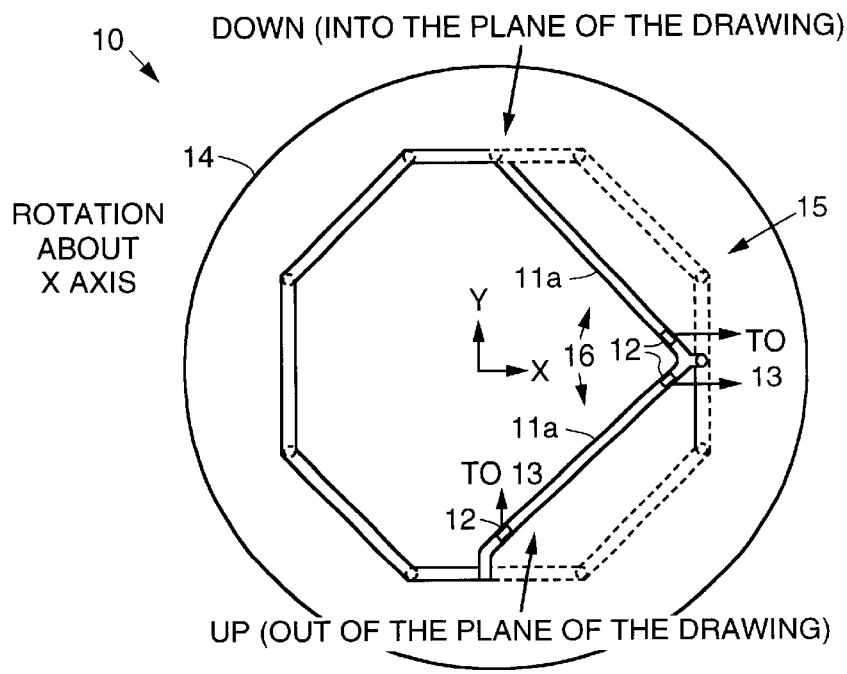
FIGS. 3 and 4 illustrate exemplary backup structures and piezoelectric elements in accordance with the principles of the present invention that are used to selectively steer a reflector antenna around selected axes.
Figure 4:
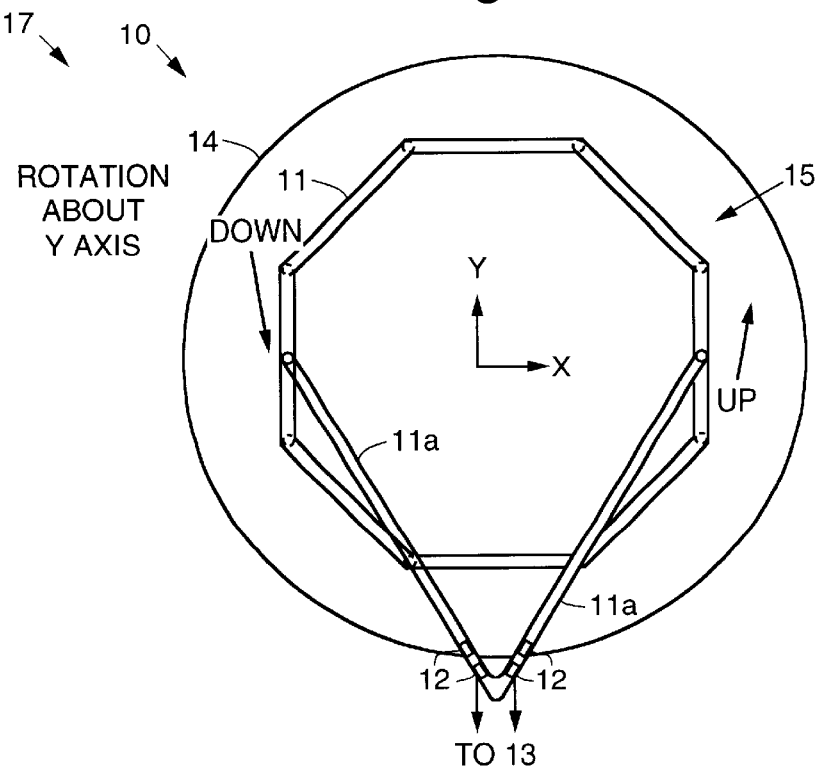

In the case of a cantilever beam 11 such as is shown in FIG. 1, for example, the piezoelectric element 12 may be attached in a root region where the beam 11 is fixed to a solid structure, such as the body of a spacecraft 17 (generally designated in FIGS. 2–4). The spacecraft 17 may be located in a substantially geosynchronous orbit. FIG. 1 illustrates beam tip deflection for an activated pair of piezoelectric patches 12. When the piezoelectric element 12 is excited by an applied voltage, the piezoelectric element 12 stretches and deforms the structure 11 in a known and controlled manner. By varying the amount of applied voltage derived from the voltage control source 13, the deformation of the structure 11 is precisely controlled.

A finite element analysis (FEA) model of a simple cantilever beam 11 was created (illustrated in FIG. 1) to demonstrate the control authority that is possible with a single pair of piezoelectric element 12. The model beam 11 was constructed using 8 layers of M55J fabric (0.040 inches total thickness) and had dimensions of 1.5 inches in width, 1.5 inches in height, and 30 inches in length. The piezoelectric elements 12 were applied to top and bottom surfaces of the model beam 11 and an equivalent applied voltage of 200 V was applied to the piezoelectric elements 12 (200 V was applied to the top element 12, and −200 V was applied to the bottom element 12).

The tip deflection (that is, the amount of deflection at the distal end of the beam 11 from the location of the piezoelectric elements 12) was 0.0015 inches. Although the tip deflection is relatively small, it is in the correct order of magnitude to provide shape modifications to reflector backup structures on the spacecraft 17. The number of piezoelectric elements 12 may be increased to obtain the necessary amount of deflection to point +/−0.125 degrees for a typical reflector antenna, for example. This is the desired amount of pointing motion necessary for a spacecraft antenna system currently under development by the assignee of the present invention.

The present invention thus provides for active steering of a non-deployable or deployable appendage 14, such as the reflector antenna 14, a communications antenna 14, or an imaging sensor, for example, through the use of piezoelectric elements 12 patches disposed on a backup structure holding the appendage 14 (reflector antenna). The present invention uses the properties of piezoelectric materials (smart materials) to stretch and deform structural members holding the appendage 14 (reflector antenna). This controllable deformation is used to point or position the reflector antenna, or any non-deployable or deployable appendage disposed on the spacecraft 17. Exemplary implementations of the present invention are discussed below with reference to FIGS. 2–4.

FIG. 2 generally illustrates a spacecraft 17 carrying an exemplary reflector antenna 14 coupled to a reflector backup structure 15 comprising a plurality of structural elements 11 or beams 11. Eight beams 11 form an octagon and comprise a conventional reflector backup structure 15 used to secure the reflector antenna 14, Additional structural elements 11 or beams 11 (referred to hereinafter as control beams 11a) are connected to selected beams 11 of the octagonal reflector backup structure 15 to provide for steering control in accordance with the present invention. Selected ones of the additional structural elements 11 or beams 11 have one or more piezoelectric elements 12 attached to selected surfaces thereof. Each of the piezoelectric elements 12 are electrically connected to a voltage control source 13.

While voltage controlled piezoelectric elements 12 have been disclosed as the exemplary deformation element employed in implementing the present invention, it is to be understood that other types of elements that may be controlled using current control, for example, may also be employed in lieu of the voltage controlled elements 12. Consequently, the present invention is not limited only to the use of voltage controlled elements 12.

The layout illustrated in FIG. 2 simulates a gimbal for the reflector antenna 14, allowing for independent rotation about two axes of interest (X, Y). FIGS. 3 and 4 illustrate details of exemplary backup structures 15 using piezoelectric elements 12 in accordance with the principles of the present invention to selectively steer a reflector antenna 12 around selected axes.

Rotation about the Y axis is accomplished by the use of piezoelectric elements 12 located near deployment and positioning mechanism (DAPM) connections close to the body of the spacecraft 17. Each of the control beams 11a is deflected in opposite directions, effectively rotating the reflector antenna 14 about its center.

Rotation about the X axis is accomplished by supporting the octagonal reflector backup structure 15 with a tube frame 16 comprising a plurality of tube members comprising control beams 11a. The tube members (control beams 11a) are deflected by applying voltage to piezoelectric elements 12 coupled thereto in order to drive rotation of the octagonal reflector backup structure 15, and hence the reflector antenna 14, about the X axis.

Another possible layout uses circular tubes (control beams 11a) wherein the piezoelectric patches directly induce torsion in the tubes. This may simplify the configuration and number of control beams 11a for some applications.

The finite element analysis performed by the present inventors indicates that the present invention is able to control the pointing of a antenna reflector 12 and that the necessary range of motion is obtainable using currently available piezoelectric elements 12, such as the above-mentioned ACX actuators.

FIG. 5 is a flow diagram that illustrates and exemplary method 20 in accordance with the principles of the present invention. The exemplary method 20 comprises the following steps.

An appendage 14 is secured 21 to a backup structure 15 comprising a plurality of beams 11. A plurality of control beams 11a are secured 22 to the backup structure 15. A plurality of deformation control elements 12, such as piezoelectric elements 12, for example, are secured 23 to selected surfaces of selected ones of the plurality of control beams 11a. The deformation control elements 12 are connected 24 to a control source 13, such as a voltage control source 13, for example. Selected ones of the deformation control elements 12 are activated 25 to deform the associated control beams 11a to point the appendage 14 in a desired direction. The appendage 14 is pointed by selectively rotating it about predetermined axes of rotation.

While appendage steering using smart material deformation may sometimes eliminate the need for conventional steering actuators, it can be advantageous to use smart material steering in tandem with conventional mechanisms. For example, using a coarse mechanism with smart material steering produces more range than smart material steering alone but with better resolution than the coarse mechanism alone. Another example is the use of a smart material steering to produce rotation about one or more axes while mechanisms are used to produce rotation about other axes, especially when the system is more robust to errors about the axes steered by the mechanism.

Appendage steering using smart materials can also be extended to provide active damping to damp appendage oscillations. In particular, signals provided by the control source 13 are chosen to damp out oscillations of the appendage 14. Such active damping not only improves appendage pointing due to the lessening of oscillation, it can improve the stability of the attitude control system of the spacecraft 17 by lessening possible resonances. For example, a control signal specified by the control source 13 can be chosen by considering the derivative of the appendage oscillation. A specific example of this would be the combination of a conventional-mechanism steering system that provides control of the mean pointing of the appendage 14 while a possibly-autonomous smart-material system reduces the appendage oscillation. A further extension would be a smart-material system which considers a combination of the appendage pointing error and its derivative(s) to choose a control signal that damps out oscillation while correcting pointing error.

Thus, apparatus and methods that use smart materials to deform backup structures for the purpose of pointing or controlling deployable appendages on a spacecraft have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Apparatus for controlling the pointing direction of an appendage disposed on a spacecraft, comprising:
    a backup structure comprising a plurality of beams whose respective ends are secured to the appendage;
    a plurality of control beams secured to selected beams of the backup structure;
    a plurality of deformation control elements secured to selected surfaces of selected ones of the plurality of control beams; and
    a control source connected to the deformation control elements which is operative to activate selected ones of the deformation control elements to deform the associated control beams to point the appendage in a desired direction.

2. The apparatus recited in claim 1 wherein the appendage is deployable from a nonoperative position to an operative position.

3. The apparatus recited in claim 1 wherein the appendage is non-deployable so as to be in a fixed position relative to the spacecraft.

4. The apparatus recited in claim 1 wherein the plurality of deformation control elements comprise piezoelectric elements.

5. The apparatus recited in claim 2 wherein the control source comprises a voltage control source.

6. The apparatus recited in claim 2 wherein the appendage is pointed by selectively rotating it about predetermined axes of rotation.

7. The apparatus recited in claim 2 where the spacecraft is in a substantially geosynchronous orbit.

8. The apparatus recited in claim 2 where the appendage comprises a communications antenna.

9. The apparatus recited in claim 2 where the appendage comprises an imaging sensor.

10. The apparatus recited in claim 1 where the signals provided by the control source are chosen to damp out oscillations of the appendage.

11. A method for controlling the pointing direction of an appendage disposed on a spacecraft, comprising the steps of:
    securing a backup structure comprising a plurality of beams whose respective ends are to the appendage;
    securing a plurality of control beams to selected beams of the backup structure;
    securing a plurality of deformation control elements to selected surfaces of selected ones of the plurality of control beams;
    connecting the deformation control elements to a control source; and
    activating selected ones of the deformation control elements to deform the associated control beams to point the appendage in a desired direction.

12. The method recited in claim 11 wherein the step of securing an appendage to the backup structure comprises the step of securing an appendage to the backup structure that is deployable from a non-operative position to an operative position.

13. The method recited in claim 11 wherein the step of securing an appendage to the backup structure comprises the step of securing an appendage to the backup structure that is in a fixed, non-deployable, position relative to the spacecraft.

14. The method recited in claim 11 wherein the step of securing a plurality of deformation control elements comprises the step of securing a plurality of piezoelectric elements.

15. The method recited in claim 11 wherein the control source comprises a voltage control source.

16. The method recited in claim 11 wherein the appendage is pointed by selectively rotating it about predetermined axes of rotation.

17. The method recited in claim 6 where the spacecraft is in a substantially geosynchronous orbit.

18. The method recited in claim 11 where the appendage comprises a communications antenna.

19. The method recited in claim 11 where the appendage comprises an imaging sensor.

20. The method recited in claim 11 where the signals provided by the control source are chosen to damp out oscillations of the appendage.

* * * * *